United States Patent [19]

Lindsay et al.

[11] 3,886,264

[45] May 27, 1975

[54] PROCESS FOR HYDROLYZING ALUMINUM ALKOXIDES USING SULFUROUS ACID

[75] Inventors: Kenneth L. Lindsay; Paul Kobetz, deceased, late of Baton Rouge, La.

[73] Assignee: Ethyl Corporation, Richmond, Va.

[22] Filed: Nov. 6, 1972

[21] Appl. No.: 305,171

[52] U.S. Cl. ............... 423/512; 423/630; 423/122; 260/632 A
[51] Int. Cl. ................... C01b 17/45; C01b 17/46; C01b 17/62; C01b 17/98
[58] Field of Search .......... 423/127, 512, 630, 122; 260/632 A, 632 D

[56]  References Cited
UNITED STATES PATENTS

| | | | |
|---|---|---|---|
| 3,053,905 | 9/1962 | Coyne et al. | 423/630 |
| 3,475,501 | 11/1967 | Guzick et al. | 260/632 |
| 3,647,374 | 3/1972 | Nomura et al. | 423/630 |

OTHER PUBLICATIONS

Chemical Abstracts, Vol. 63, No. 5270h, by P. V. Dybina, 1965.

Chemical Abstracts, Vol. 53, No. 21316b to 21316d, by P. V. Dybina.

*Primary Examiner*—Oscar R. Vertiz
*Assistant Examiner*—Eugene T. Wheeler
*Attorney, Agent, or Firm*—Donald L. Johnson; John F. Sieberth; Shelton B. McAnelly

[57] ABSTRACT

It is disclosed that aluminum alkoxides are hydrolyzed to produce alcohols and a selected water-soluble aluminum salt by performing the hydrolysis in an aqueous sulfurous acid system. The alcohols are readily separated from the aluminum salt solution following which the selected soluble aluminum salt is readily converted to an insoluble aluminum salt to facilitate its separation from water. The $SO_2$ thus recovered is advantageously recycled for the hydrolysis of additional quantities of aluminum alkoxide.

19 Claims, No Drawings

PROCESS FOR HYDROLYZING ALUMINUM ALKOXIDES USING SULFUROUS ACID

BACKGROUND OF THE INVENTION

1. Field of the Invention

The invention relates to the preparation of alcohols by the hydrolysis of aluminum alkoxides and to the co-production of a solution of a selected water-soluble aluminum salt which is readily separated from the alcohols and later converted to a suspension of an insoluble salt from which the bulk of the water may be removed by low cost supplemental separation operations without requiring evaporation thereof.

2. Description of the Prior Art

It is well known in the art that aluminum alkoxides are readily hydrolyzed even with water to produce alcohols whose carbon skeletal chains correspond to the organic groups of the aluminum alkoxides and whose hydroxyl groups are located at the point of attachment of the oxygen atom linking the organic groups of the alkoxides to the aluminum atoms. The hydrolysis process is described generally together with ways for producing aluminum alkoxides in U.S. Pat. No. 2,892,858. Numerous typical organo aluminum compounds, of cyclic and acyclic structure, of saturated and unsaturated structures, of straight chain and branched chain structures, and of various combinations of such aspects, and methods of producing the compounds are described in U.S. Pat. No. 2,835,689. Such materials are readily converted to aluminum alkoxides by oxidation with molecular oxygen or with chemical oxidants. Other patents of interest in connection with the production and/or hydrolysis of aluminum alkoxides include U.S. Pat. Nos. 2,636,865; 2,776,188; 2,805,920; 2,917,366; 2,961,452; 3,017,438; 3,024,287; 3,030,402; 3,035,077; 3,053,905; 3,087,954; 3,091,627; 3,093,691; 3,100,231; 3,154,585; 3,247,264; 3,255,256; 3,264,063; 3,278,262; 3,314,749; 3,357,791; 3,384,458; 3,394,990; 3,412,127; 3,419,352; 3,450,735; 3,468,625; 3,475,501; 3,493,623; 3,497,538; and 3,499,918. Other patents of interest are Canadian Pat. No. 886,043 and British Pat. Nos. 935,802; 941,567 and 1,253,764.

For the most part, it is characteristic of the hydrolysis of aluminum alkoxides that the reaction readily produces alcohols even in aqueous environment; however, unless special precautions are taken, serious problems arise in connection with securing complete hydrolysis and in handling and recovering the products of the hydrolysis. The use of organic or inorganic acids or bases in the reaction usually is desired to facilitate product recovery. Thus the use of about a stoichiometric amount of sulfuric acid in the hydrolysis operation is usually highly preferred; however, such usage results in the formation of aluminum sulfate solution in a two-phase liquid system also containing the product alcohols. Although the hydrolysis proceeds readily and the alcohols are readily separated from the alum solution as a less dense supernatant layer, the by-product alum is of comparatively low value and there is no convenient inexpensive procedure available for treatment thereof to recover the sulfuric acid for recycle or for other uses.

In some of the prior art, the hydrolysis has been conducted with water only seeking to produce a desirable co-product aluminum oxide or hydroxide which is dehydratable to produce alumina. Unfortunately, with water hydrolysis processes, the aluminum hydroxide forms with water a difficult to handle gel from which it is difficult and time-consuming to effect complete hydrolysis and recovery of the alcohols. Thus, even in such "water hydrolysis" systems, it usually is necessary to use other materials for gel and emulsion control such as acetic acid, added light alcohols, salts, etc.

As evidenced by the numerous patents in the area, considerable effort has been applied over a long period of time seeking ways to improve this situation; however, until the present invention, no really good way was available to handle the separation problems, the by-product problem and the recycle problem.

The problem of by-product credit has led to experimentation along the lines of using HF of fluosilicic acid in hydrolysis seeking enhanced value of aluminum-fluorine by-product compounds in contrast to alum. That thought should be given to the use of such materials as HF in the hydrolysis of aluminum alkoxides, is indicative of the seriousness of the problem and the lack of knowledge of suitable simple alternate procedure or process.

Since the prior art suffers from one or more disadvantages along the lines set forth in the foregoing, it is an object of the present invention to provide an improved hydrolysis process for aluminum alkoxides which has the advantage of producing a selected aluminum salt as a by-product which salt initially is water soluble avoiding gel or emulsion retardation of the hydrolysis reaction and permitting excellent separation thereof from the product alcohols and which salt subsequently is readily rendered insoluble at low cost thereby permitting the easy separation of water therefrom without expensive evaporation.

Another object of the present invention is to provide a hydrolysis process for aluminum alkoxides using a hydrolysis reactant which is readily recovered from the hydrolysis by-product for recycle.

Another object of the present invention is to provide a process for hydrolyzing aluminum alkoxides to produce basic aluminum sulfite which may be readily treated to produce alumina.

Other and further objects and features of the present invention will become apparent upon a careful consideration of the following discussion.

SUMMARY OF THE INVENTION

In accordance with the teachings of the present invention, a process is provided whereby aluminum alkoxides are hydrolyzed to produce alcohols and a by-product water soluble aluminum salt by reacting the aluminum alkoxides with sulfurous acid in an aqueous system in proportions of at least about 1.5 mol of sulfurous acid per mole of aluminum alkoxide. Difficult gels are avoided and the sulfurous acid is readily recovered for recycle. A soluble aluminum sulfite salt is obtained and readily converted to an insoluble salt if desired.

The present invention is directed to a process for hydrolyzing aluminum alkoxide to produce alcohols and basic aluminum sulfite which comprises reacting aluminum alkoxide with sulfurous acid in an aqueous system in proportions of at least about 1.5 mol of sulfurous acid per mol of aluminum alkoxide to form alcohol and an aluminum sulfite solution, separating the alcohol from the aluminum sulfite solution, removing at least a portion of the $SO_2$ from the aluminum sulfite solution to form an insoluble aluminum compound, and recovering the insoluble aluminum compound.

In a preferred aspect of the process of the present invention, the mol ratio of sulfurous acid to aluminum alkoxide is from about 1.5:1 to about 10:1, preferably from about 1.5:1 to about 3:1, or from about 1.5:1 to about 2:1. Preferably, each of the reacting and removing steps is performed at a temperature of from about 25° to about 100°C, with a temperature of from about 30° to about 60°C being preferred for the reacting step, and a temperature of from about 50° to about 90°C being preferred for the removal of at least a portion of the $SO_2$ to convert the soluble aluminum sulfite to an insoluble aluminum sulfite.

Preferably the $SO_2$ driven off in the "removal of $SO_2$" step is recycled to form sulfurous acid for the reacting step.

As the term "aluminum alkoxide" is used in the present specification and claims, it refers broadly to the organic compounds as defined in Hackh's Chemical Dictionary, 3rd Edition (1944), page 32, wherein the metal is aluminum and wherein the aluminum is removed from the organic compound and in effect replaced by hydrogen in hydrolysis to produce organic compound containing the hydroxyl group as such together with a by-product aluminum compound. Preferred categories of aluminum alkoxides are defined hereinafter. It will be recognized that the term "aluminum alkoxide" is synonomous with the frequently used term "aluminum alcoholate" as seen in some of the prior art such as in U.S. Pat. Nos. 2,636,865 and 2,892,858. In general, the term "alkoxide" is not limited to compounds wherein the organic groups are alkyl groups; for example, U.S. Pat. No. 2,961,452 shows that complex organic compounds containing internal unsaturation react in a manner similar to preferred organic compounds having alkyl-only organic groups and also produce corresponding alcohols.

The term "alkoxy" is defined in Hackh's, ibid., with an alkyl group connotation and hence where used herein is intended in such accepted sense. Thus, alkoxy aluminum or trialkoxy aluminum compounds refer to compounds with alkyl organic radicals while the term "aluminum alkoxides" has the broader meaning set forth herein. In general, the hydrolysis of trialkoxy aluminum compounds is a highly preferred way to produce preferred alcohols whose R radicals are alkyl radicals.

The various categories of alcohols classified according to the number of hydroxy groups per molecule may be monohydroxy, or polyhydroxy such as dihydroxy or diol or glycol. Preferred alcohols have primary hydroxy structures, i.e., —$CH_2OH$, such being classified according to the relation of the carbon atom. Particularly preferred compounds produced by the present hydrolysis process are monohydroxy primary alcohols; i.e., compounds having one hydroxyl group per molecule, that one group being attached to or "on" a primary carbon atom of the organic radical.

It is known that hydrolysis of various aluminum alkoxides produces various corresponding structured mono and poly hydroxy alcohols which are otherwise unsubstituted or which contain compatible, (i.e., not adversely reactive) substitution, preferably hydrogen or hydrocarbon substitution only. Typical classes of alcohols produced include straight chain alkanols, branched chain alkanols; terminal or non-terminal diols branched or unbranched, unsubstituted or with compatible substitution on terminal or internal carbon atoms; straight chain alkenols, branched chain alkenols; cyclo-alkanols, -alkenols, branched or unbranched; and the like. As is conventional and known to those skilled in the art, one usually selects as starting aluminum alkoxide for hydrolysis a material whose organic groups contain the desired carbon skeletal structure of the desired product alcohol and which has the oxygen bonding between the aluminum and the organic groups located at the point of the carbon skeleton chain of the groups which is desired for the location of the hydroxyl group or groups in the product alcohol. Of course, it is obvious to those skilled in the art that one does not use the present hydrolysis process with inoperative starting materials or with materials where the reactants or products undergo side reactions unless such side reactions are desired to produce selected products having different carbon skeleton structures from those of the materials used to produce them.

In preferred aluminum alkoxides hydrolyzed by the present process, the organic groups bound to the aluminum through the oxygen are hydrocarbon groups, more preferably alkyl groups. This preference arises because of the high reactivity in hydrolysis of such groups and the excellent properties of the product from such hydrolysis, particularly primary monohydroxy alcohols.

In preferred aluminum alkoxides hydrolyzed by the present process, the organic groups have from about 2 to about 30 carbon atoms per group, wherein a major proportion of the groups on a mol basis has from about 6 to about 24 carbon atoms per group, especially wherein a major proportion of the groups on a mol basis has from about 10 to about 18 carbon atoms per group. The products of the preferred alkoxides have particularly valuable properties and in addition have the desirable aspect of excellent physical properties conducive to rapid and thorough hydrolysis and recovery.

Although the hydrolysis of aluminum alkoxides where all of the organic groups present in a given system are the same in number of carbon atoms per group and in carbon skeletal structure is contemplated, the hydrolysis of aluminum alkoxides containing various mixtures of organic groups is also contemplated specifically, such as a wide range chain growth product obtained by reacting ethylene with triethyl aluminum and subsequent oxidation or by a TIBA displacement using a mixture of different olefins from a wide range or selected cut or blend followed by oxidation. In general, it is preferred that in such mixtures the content of organic radicals falling out of the preferred carbon number ranges set forth herein is no more than about 25 percent below the range and 25 percent above the range, even more so where the content out of the range is no more than about 10 percent below and 10 percent above, these proportions being on a mol basis.

The preferred hydrocarbon and alkyl groups are even more preferred when combined with the about 2 to about 30, the about 6 to about 24 and the about 10 to about 18 carbon atoms per group preferences set forth previously. Peaking to achieve such preferred mixtures with chain growth processes is disclosed in U.S. Pat. Nos. 3,384,651 and 3,415,861. Such peaking and the resulting compounds are highly preferred because of the avoidance of consumption of raw materials in producing alcohols of lessdesired properties.

To produce alcohols similar to natural source alcohols known and used for decades, such as those obtained from coconut oil, alkyl groups in individual aluminum alkoxides compositions or in mixtures hydrolyzed as described herein preferably have an even number of carbon atoms per group such as tri-n-butyloxy aluminum, tri-n-hexyloxy aluminum, tri-n-octyloxy aluminum, tri-n-decyloxy aluminum, tri-n-dodecyloxy aluminum, tri-n-tetradecyloxy aluminum and tri-n-octadecyloxy aluminum, tri-2-ethyl-hexyloxy aluminum, tri-2-ethyl-decyloxy aluminum. The invention is equally applicable to the use of compounds having odd numbers of carbon atoms per group such as tri-n-propyloxy aluminum, tri-n-pentyloxy aluminum, tri-n-undecyloxy aluminum, tri-n-tridecyl aluminum, tri-n-pentadecyloxy aluminum and tri-n-heptadecyloxy aluminum as well as to compounds with more complex organic structures such as tricitronellyloxy aluminum or tricitronellyl aluminate as the term is used in U.S. Pat. No. 2,961,452. The "odd" carbon atom aluminum alkoxide compounds are readily produced using appropriate olefins in displacement on triisobutyl aluminum or other straight or branched chain organic radical aluminum compounds or starting with tri-n-propyl aluminum in chain growth with even or odd carbon olefins. Such "odd-carbon atom" products can have advantages over the "even-carbon atom" products because of the lower melting points of many derivatives.

Accordingly, the following are preferred aspects of the present invention.

In a preferred aspect, the organic groups of the aluminum alkoxides hydrolyzed are hydrocarbon groups having from about 2 to about 30 carbon atoms per group.

In a preferred aspect, the organic groups of the aluminum alkoxides hydrolyzed are alkyl groups having from about 2 to about 30 carbon atoms per group.

In a preferred aspect, the organic groups of the aluminum alkoxides hydrolyzed are hydrocarbon groups wherein a major proportion of the groups on a mol basis has from about 6 to about 24 carbon atoms per group.

In a preferred aspect, the organic groups of the aluminum alkoxides hydrolyzed are alkyl groups wherein a major proportion of the groups on a mol basis has from about 6 to about 24 carbon atoms per group.

In a preferred aspect, the organic groups of the aluminum alkoxides hydrolyzed are hydrocarbon groups wherein a major proportion of the groups on a mol basis has from about 10 to about 18 carbon atoms per group.

In a preferred aspect, the organic groups of the aluminum alkoxides hydrolyzed are alkyl groups wherein a major proportion of the groups on a mol basis has from about 10 to about 18 carbon atoms per group.

U.S. Pat. No. 2,892,858 discloses the oxidation of hydrocarbons containing a methylene radical bound to the aluminum as, for example, aluminum trialkyls or aluminum alkyl hydrides, and the subsequent hydrolysis. These aluminum compounds may be represented by the general formula

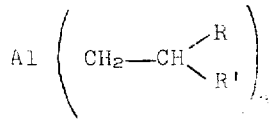

or

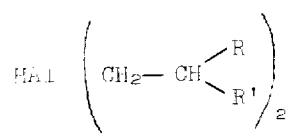

in which R and R' represent hydrogen or a hydrocarbon radical such as an alkyl radical and in which

may be in the form of a hydrocarbon ring.

These aluminum hydrocarbons may be readily and economically prepared as, for example, in accordance with the methods of U.S. Pat. Nos. 2,835,689; 3,384,651 and 3,415,861.

As a result of the oxidation of these aluminum hydrocarbons, aluminum alkoxides are formed which correspond in carbon skeletal structure to the starting aluminum organic compounds with an oxygen atom interposed between the original organic radicals and the aluminum atoms.

Starting aluminum organic compounds for conversion to aluminum alkoxides may be obtained in accordance with West German Pat. No. 889,229 and U.S. Pat. No. 2,826,598. In accordance with these patents, higher molecular weight trialkyl aluminum compounds are built up from triethyl aluminum by reaction with olefin such as an ethylene. As alcohol ultimately produced in accordance with the invention corresponds to the organic radical portion connected to the aluminum in starting aluminum compounds, it is possible in this manner to synthesize higher primary fatty alcohols from ethylene in accordance with the invention. It is known that such alcohols contain terminal-internal diols indicating that secondary hydroxyl structures CHOH are also produced via the hydrolysis operation.

In accordance with U.S. Pat. Nos. 2,835,689 and 3,389,161 an olefin is exchanged with the organic radical on an aluminum hydrocarbon thereby forming a wide variety of selectable starting aluminum hydrocarbons, the hydrocarbon radical portion of which corresponds to the carbon skeletal structure of the olefin. In this way numerous starting aluminum hydrocarbons may be obtained by selecting an olefin for exchange having the carbon skeleton structure desired in the product alcohol. thus, for example, higher boiling alpha-olefins may be reacted with triisobutyl aluminum to form aluminum hydrocarbons having an organic radical portion corresponding to the alpha olefins, H and Al being substituted at the double bond location which preferably is a terminal double bond of an alpha olefin. Thus, it is possible, in accordance with the invention, to convert olefins in turn to produce aluminum hydrocarbons, aluminum alkoxides and finally alcohols. Thus, for example, the alpha-olefins obtained from the cracking of the higher boiling fractions of the Fischer-Tropsch synthesis from wax cracking, from dehydrogenation of paraffins, etc., may be converted into the corresponding alcohols.

The formation of aluminum hydrocarbon from olefin in accordance with U.S. Pat. Nos. 2,835,689 and 3,389,161 and the subsequent conversion into the alcohol by the oxidation and with hydrolysis in accordance with the present invention, is easily effected merely by contacting an aluminum hydrocarbon having a methylene radical connected to the aluminum as, for example, triisobutyl aluminum, with an olefin at a temperature between about 50° and 150°C. The olefins used for this purpose may be any olefin having a terminal double bond, cyclo olefins having 4, 5, 7 and 8 carbon atoms and at least one $R_2C=CH$ group in the ring and fulvenes. Even olefins with non-terminal double bonds such as internal olefins may be used to produce aluminum organic compounds as described in U.S. Pat. Nos. 2,959,607; 3,282,974; 3,291,819 and 3,322,806. Isomerization of the resulting organoaluminum compounds prior to oxidation makes it possible to produce products which are different in carbon skeleton structure from starting olefins. Other processing variations are known to produce different structures such as dimerization, oligomerization, and the like.

When starting, in accordance with the invention, with aluminum hydrocarbons in which the aluminum has all its valence linkages bound to hydrocarbons, as may be represented by the formula

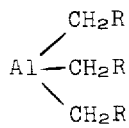

in which R is a hydrocarbon radical, during the course of the auto-oxidation, in accordance with the invention, the compounds pass successively into

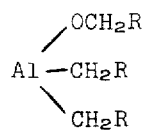 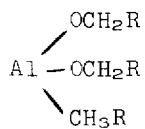

and

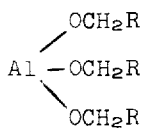

The oxidation forming the first two types of compounds, takes place extremely rapidly while the oxidation forming the third type of compound requires a rather lengthy re-oxidation at ordinary or even slightly increased temperatures.

The oxidation may be started with a gas containing only a small amount of oxygen as, for example, nitrogen to which only a small amount of air has been added, gradually increasing the oxygen concentration during the course of the reaction. Although it is desired to avoid explosive mixtures, even pure oxygen may be present in the final stage. The gases used for the oxidation should be extensively dried since otherwise due to side reactions, hydrocarbon radicals as such in non-oxidized form can prematurely split off the aluminum resulting in a decrease in yield of desired product alcohol. For effecting the oxidation, the oxidizing gases may be maintained in circulation and oxygen may be added at some point in the circuit. Numerous oxidation procedures may be used, with the procedure of U.S. Pat. No. 3,475,476 being preferred in many instances. The temperature of the oxidation may vary widely as, for example, between temperatures of minus 20° and plus 150°C. Usually, it is more practical to use temperatures between 0° and 100°C, with temperatures between about 30° and 60°C being preferred.

As oxidation progresses, the aluminum alkoxides generally become quite viscous. Thus, it is generally preferred to conduct the oxidation in an inert solvent or diluent system. The oxidation solvent is suitably removed prior to the hydrolysis or alternately, retained in the hydrolysis and recovered subsequent to the hydrolysis. Preferred solvents are preferably hydrophobic so as to avoid undesired mutual solubilizing of water and product alcohols. In some instances it is desirable to use one solvent in oxidation, to remove it prior to hydrolysis and add a different solvent for the hydrolysis step.

In general, preferred solvents are hydrocarbons, typically olefins or paraffins having from about 6 to about 20 carbon atoms per molecule. Such hydrocarbons can be aliphatic or aromatic, cyclic or acyclic, straight chain or branched chain or various combinations.

Typical solvents are hexane, hexene, decane, tetradecane, mixtures of hexane and hexene. Toluene, benzene, ethyl benzene, cyclohexane and cyclohexene are other suitable solvents. As is well known, the oxidation may be conducted in the presence of residual olefin remaining from a prior chain growth or displacement process used to produce the aluminum alkyl starting materials. All or part of such residual olefin may be retained as solvent or diluent in the hydrolysis step.

The amount of solvent or diluent used in hydrolysis is not critical for the hydrolysis itself and usually is determined by factors extrinsic to the hydrolysis itself such as solubility of alkoxides, the amount of residual olefins and the like. Typical solvents and representative proportions are set forth in the examples.

In the hydrolysis of the present process, the mol ratio of $SO_2$ or $H_2SO_3$ to aluminum (Al) is from about 1.5:1 to about 10:1, preferably from about 1.5:1 to about 3:1 with about 1.5:1 to about 2:1 being particularly preferred. The lower numerical limit of $x$ of the water soluble aluminum sulfite species $Al_2O_3 \cdot xSO_2$ is with $x$ equal to about 3.0. Thus, it is desirable to have at least a 1.5:1 ratio of $SO_2$ to Al in the hydrolysis operation per se and in the portion of the subsequent separation where the product alcohol is separated from the aluminum sulfite solution. In general, there is no rigid upper limit on $x$, values of 5 or 10 or even higher being useful. On the other hand, rarely is it necessary or desirable to use an $x$ greater than about 2.

Sulfurous acid used as a hydrolysis reagent is suitably preformed by combining $SO_2$ and water at a temperature of from about 0° to about 50°C and at a pressure of from about 0 to about 50 psig. The ratio of water to $SO_2$ is not critical and in general weight ratios of from about 4 to about 15 percent $SO_2$ by weight are useful. Optionally all of the water needed for hydrolysis may be fed in the $H_2SO_3$ solution or a more concentrated solution of $H_2SO_3$ can be used accompanied by feed of a separate stream of water.

Typically, the amount of water used in hydrolysis is selected to provide a conventional water/aluminum alkoxide ratio as used in prior art hydrolysis processes such as those of U.S. Pat. No. 3,475,501 which use acids such as $H_2SO_4$.

Alternatively the sulfurous acid is generated in situ by feeding aluminum alkoxide, water and $SO_2$ to a single reaction vessel continuously or to a combination of two or more reaction vessels in a batch-wise or semi-continuous manner.

Hydrolysis and the subsequent steps such as the removing step are preferably conducted at a temperature of from about 0° to about 200°C, preferably from about 25° to about 100°C, particularly from about 30° to about 60°C. Operation at atmospheric pressure is preferred for convenience and low cost construction of equipment; however, at temperatures of above about 60°C, super-atmospheric pressure is usually desired to minimize the premature decomposition of the soluble aluminum sulfite salt into an insoluble species during hydrolysis. In some instances it may be desired to perform the present process so as to precipitate out during hydrolysis some insoluble aluminum sulfite which is separated from the hydroxy organic compound-water system and is followed by a distillation or decantation separation of the water and alcohol. This can be performed at lower pressures than where it is desired to retain the soluble species. Although such is less preferred, in some instances insoluble aluminum sulfite is readily separated from alcohol-water systems.

The time duration of the hydrolysis and following operations is not critical. The hydrolysis reaction itself is usually exceedingly rapid, virtually instantaneous, so that preferred reaction and separation times are largely a matter of physical parameters connected with the contacting of the reactants and of other physical considerations such as decantation times, disengagement of $SO_2$, and the like. One important advantage of the present process accrues from the characteristic that prolonged digestion periods to grow crystals or separate gels or emulsions are not necessary since the precipitates form and grow rapidly and emulsions or gels are not problems when dealing with the present liquid phase systems.

The decantation operation that usually follows the hydrolysis and wherein the organic (alcohol) phase is separated from the aqueous phase is typically conducted at temperatures and pressures which are about the same in ranges and preferred conditions as the hydrolysis itself. This is because the separation is rapid and similar physical characteristics of melting points, vapor pressure, etc. are encountered. Preferably the hydrolysis effluent flows directly to one or more "settling" tanks where the organic phase containing the hydroxy organic compound product floats to the top and is drawn off. Thus typically, the decantation is at a temperature ranging from about the hydrolysis temperature down to about the freezing point of the highest freezing material present. In general, it is desired to avoid excessive evolution of $SO_2$ during the decantation to minimize precipitation at that point of an insoluble species of aluminum sulfite. Thus the pressure used in decantation is usually within about 10 to 15 pounds per square inch of that used in the hydrolysis, preferably at about the same pressure to simplify control problems.

The alcohols obtained from the decantation are treated and purified in a conventional manner, typically, in a wash with caustic and/or water and drying as in U.S. Pat. No. 3,475,501 and with purification of all or part of the alcohol as in U.S. Pat. No. 3,468,965. Alcohols thus obtained may be utilized in known manner, for example, in the production of esters by reaction with acid or in the formation of detergents as by sulfation. Such processes are of course well known to those skilled in the art.

The aluminum sulfite solution resulting after separation from the organic phase can be merely dried to remove the water and subjected to further processing; however, important advantages of the present process are that the aluminum sulfite is readily precipitated to facilitate removal from the aluminum sulfite solution without requiring expensive evaporation of the water and that $SO_2$ can be recovered for recycle. This precipitation is easily brought about by controlling the temperature and/or the pressure of the aluminum sulfite solution after removal of the organic phase therefrom so as to remove by evolution at least a part of the $SO_2$ thereby converting the soluble aluminum sulfite into an insoluble form of aluminum. Although the solution can be heated high enough and for a sufficiently long period to remove or drive off all of the $SO_2$ to form alumina, a preferred procedure involves the driving off of only a portion of the $SO_2$ in the removal of $SO_2$ step, only enough to form an insoluble aluminum sulfite and not enough to convert the aluminum sulfite to alumina. Typically, the amount of $SO_2$ driven off provides in the aluminum sulfite an $SO_2/Al$ mol ratio of less than 1.5:1, typically from about 0.75:1 to about 1.25:1. Preferably then, the insoluble aluminum sulfite thus obtained is readily separated from the water as by filtration, following which the recovered sulfite is heated to drive off more $SO_2$ to convert it to alumina. This reduces the need to expend energy in evaporating water at the high temperatures required to drive off all of the $SO_2$. Prolonged heating at a temperature of 100°C or higher is usually necessary to convert the aluminum sulfite to alumina; however, the soluble aluminum sulfite is readily converted to the easily separable insoluble species to facilitate recovery by heating at lower temperature, of from about 25° to about 100°C, preferably from about 50° to about 90°C. The evolution of $SO_2$ is facilitated in some instances by use of sub-atmospheric pressure, particularly at the lower temperatures below about 75°C; however, ordinarily it is not desired to use pressures sufficiently low as to introduce expenses incident to significant boiling-off of water.

Thus, in general, temperatures of from about 0° to about 200°C are useful in the recovery step to remove $SO_2$ from the aluminum sulfite with temperatures of from about 50° to about 90°C being preferred, typically about 80°C, thereby converting the soluble species into an insoluble species. Pressures suitably range from about ½ atmosphere to about 12 atmospheres, with from about ¾ to about 2 atmospheres preferred to simplify equipment requirements.

The following examples indicate preferred embodiments of the present invention.

EXAMPLE I

A solution of aluminum alkoxide in solvent was prepared by reacting a 40/60 weight ratio mixture of decanol and dodecanol with an excess of metallic aluminum powder in a $C_{16}/C_{18}$ olefin solvent mixture (about 50/50 weight distribution of olefins) at reflux at atmospheric pressure. The $C_{16}/C_{18}$ olefin solvent was chosen to provide a desirable reaction temperature when at reflux at atmospheric pressure.

The resulting system was filtered to remove excess aluminum, providing a solution containing a mixture of aluminum alkoxide in olefinic solvent.

A portion of the foregoing aluminum alkoxide (40 g of aluminum alkoxide in 33 ml of olefin) was added to a 500 ml flask equipped with a magnetic stirrer. To the flask was then added 200 cc of an aqueous solution containing 6 wt. percent of $SO_2$ giving an $SO_2/Al$ mol ratio of 2.5. The mixture was stirred for about 5 minutes at room temperature (25°–30°C) providing a liquid system and then stirring was stopped to allow the system to settle to produce two liquid phases. The bottom layer was drawn off with a separatory funnel and heated at about 70°–80°C for 5 minutes in a stirred 500 ml flask. $SO_2$ was evolved. A precipitate formed and was removed by filtration. The recovered precipitate was dried in an oven at 90°C giving 9.5 grams of solids which was then analyzed. Additional $SO_2$ was liberated during the drying step. The analysis indicated 20 percent aluminum and 7.5 percent sulfur indicating a mixture of $Al(OH)_3$ and $Al_2O_3 \cdot 2SO_2 \cdot 5H_2O$.

EXAMPLE II

Example I was repeated using 167 cc of the $SO_2$–$H_2O$ solution providing 10 g of $SO_2$. This corresponded to an $SO_2/Al$ mol ratio of 2.05:1. Similar results were obtained.

EXAMPLE III

A solution of aluminum alkoxide in solvent was prepared by reacting alcohol and aluminum as in claim 1. In this instance, toluene was used as a solvent. 200 Ml of the aluminum alkoxide toluene solution containing about 9.3 grams of aluminum was added to a 1-liter magnetically stirred flask to which was then added 650 ml of an aqueous solution containing 6.2 wt. percent $SO_2$. This corresponded to approximately 40.3 grams of $SO_2$ providing a mol ratio of $SO_2$ to aluminum of 1.9:1. The mixture was reacted with stirring at room temperature for 5 minutes providing a liquid system. When the agitation was stopped, the mixture readily separated into two liquid phase layers. The water phase was separated using a separatory funnel. It was placed in a flask and heated at about 50°C for about 5 minutes during which time $SO_2$ was evolved. Precipitated solids were recovered by filtration and then dried at 50°C for 3 hours during which time $SO_2$ was liberated. The solids analyzed 17.3 percent aluminum, 18.8 percent sulfur. This is significantly higher in sulfur than Example I showing the difference caused by drying at different temperatures. The theoretical for $Al_2O_3 \cdot 2SO_2 \cdot 5H_2O$ is 17.1 percent aluminum and 20.3 percent sulfur. At the lower drying temperature of this example, the amount of the sulfite converted to $Al(OH)_3$ was noticeably less than that of Example I as shown by the Al/S ratio obtained from analysis.

EXAMPLE IV

A sample of trioctoxy aluminum in $C_{16}$–$C_{18}$ olefin solvent was prepared as in the foregoing examples by reacting aluminum with the desired alcohol which in this instance was octyl alcohol. Approximately 100 grams of trioctoxy aluminum containing about 6.5 grams of aluminum per 100 ml of $C_{16}$–$C_{18}$ olefin was reacted at room temperature for 5 minutes with 350 ml of an aqueous solution containing 6 percent $SO_2$. Most of the $Al(OH)_3$ dissolved but not all. At this point, an additional 80 grams of the 6 percent $SO_2$–$H_2O$ solution was added and stirring continued following which all of the $Al(OH)_3$ dissolved giving a clear solution which was allowed to settle into two phases which were processed as in preceding examples. In this instance the mol ratio of $SO_2$ to aluminum was 1.37 initially and approximately 1.65 after the addition of the second portion of the 6 percent $SO_2$ solution.

From the foregoing, it is evident that the novel hydrolysis process of the present invention and the accompanying recovery operations are useful with a variety of aluminum alkoxides to produce a variety of alcohols without limitation to any particular prior processing history or source of the aluminum alkoxides. A fundamental aspect of the present invention is that it relates to an improvement in a known old process, which old process has been used on a large scale for many years. There has been a long felt need for the present improvement; however, no known prior art teaches the present hydrolysis process improvement.

We claim:

1. A process for hydrolyzing aluminum alkoxide to produce alcohols and basic aluminum sulfite which comprises:

reacting aluminum alkoxide with sulfurous acid in an aqueous system in proportions of at least about 1.5 mol of sulfurous acid per mol of aluminum alkoxide to form alcohol and an aluminum sulfite solution, separating the alcohol from the aluminum sulfite solution, removing a portion of the $SO_2$ from the aluminum sulfite solution to form an insoluble aluminum sulfite, and recovering the insoluble aluminum sulfite.

2. The process of claim 1 wherein the mol ratio of sulfurous acid to aluminum alkoxide is from about 1.5:1 to about 10:1.

3. The process of claim 1 wherein the temperature of each of the reacting and removing steps is from about 25 to about 100°C.

4. The process of claim 1 wherein at least a portion of the $SO_2$ removal from the aluminum sulfite solution is at a temperature of from about 50° to about 90°C.

5. The process of claim 1 wherein the reacting step is conducted at a temperature of from about 30° to about 60°C.

6. The process of claim 1 wherein the mol ratio of sulfurous acid to aluminum alkoxide is from about 1.5:1 to about 10:1 and wherein the temperature of each of the reacting and removing steps is from about 25° to about 100°C.

7. The process of claim 1 wherein the organic groups of the aluminum alkoxide are hydrocarbon groups.

8. The process of claim 1 wherein the organic groups of the aluminum alkoxide are alkyl groups.

9. The process of claim 1 wherein the organic groups of the aluminum alkoxide have from about 2 to about 30 carbon atoms per group.

10. The process of claim 1 wherein a major proportion of the organic groups of the aluminum alkoxide on a mol basis has from about 6 to about 24 carbon atoms per group.

11. The process of claim 1 wherein a major proportion of the organic groups of the aluminum alkoxide on a mol basis has from about 10 to about 18 carbon atoms per group.

12. The process of claim 1 wherein the organic groups of the aluminum alkoxide hydrolyzed are hydrocarbon groups having from about 2 to about 30 carbon atoms per group.

13. The process of claim 1 wherein the organic groups of the aluminum alkoxide hydrolyzed are alkyl groups having from about 2 to about 30 carbon atoms per group.

14. The process of claim 1 wherein the organic groups of the aluminum alkoxide hydrolyzed are hydrocarbon groups wherein a major proportion of the groups on a mol basis has from about 6 to about 24 carbon atoms per group.

15. The process of claim 1 wherein the organic groups of the aluminum alkoxide hydrolyzed are alkyl groups wherein a major proportion of the groups on a mol basis has from about 6 to about 24 carbon atoms per group.

16. The process of claim 1 wherein the organic groups of the aluminum alkoxide hydrolyzed are hydrocarbon groups wherein a major proportion of the groups on a mol basis has from about 10 to about 18 carbon atoms per group.

17. The process of claim 1 wherein the organic groups of the aluminum alkoxide hydrolyzed are alkyl groups wherein a major proportion of the groups on a mol basis has from about 10 to about 18 carbon atoms per group.

18. A process for hydrolyzing aluminum alkoxide to produce alcohols and basic aluminum sulfite which comprises:

reacting aluminum alkoxide with sulfurous acid in an aqueous system in proportions of at least about 1.5 mol of sulfurous acid per mol of aluminum alkoxide to form alcohol and an aluminum sulfite solution, separating the alcohol from the aluminum sulfite solution, removing a portion of the $SO_2$ from the aluminum sulfite solution to form an insoluble aluminum sulfite, and reacting $SO_2$ removed from the aluminum sulfite solution to form sulfurous acid for the reacting step.

19. The process of claim 1 wherein $SO_2$ driven off provides an aluminum sulfite wherein the $SO_2$:Al mol ratio is from about 0.75:1 to about 1.25:1.

* * * * *